No. 884,718. PATENTED APR. 14, 1908.
J. H. COWHIG.
COOKING UTENSIL.
APPLICATION FILED AUG. 7, 1907.
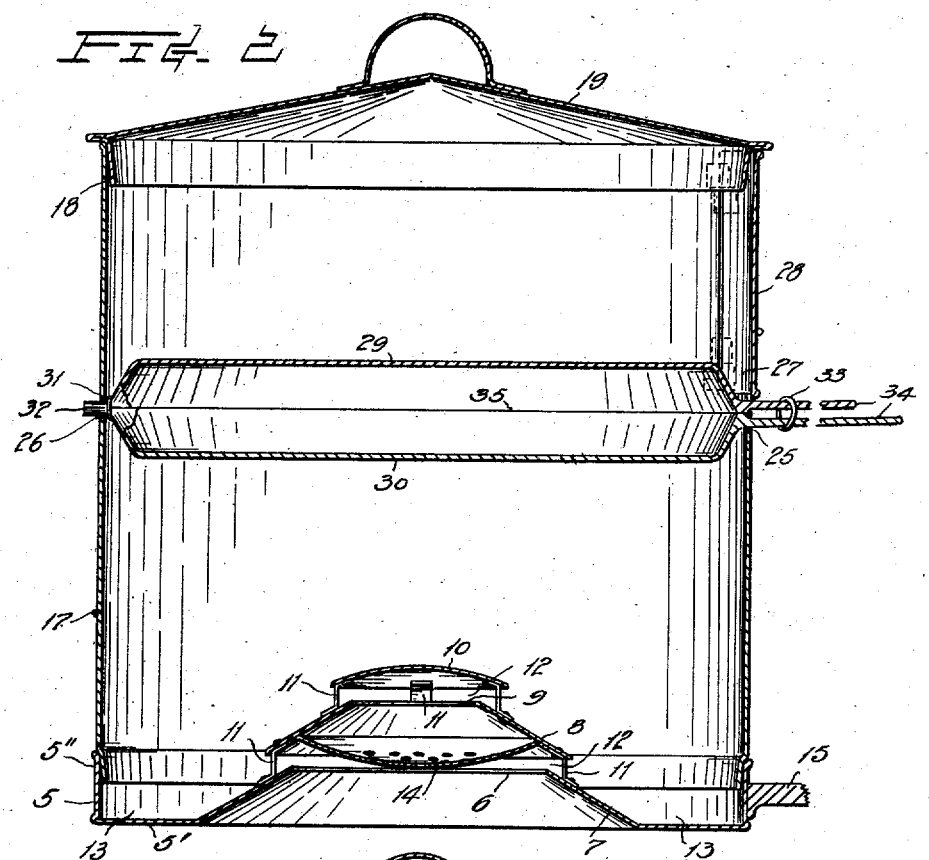
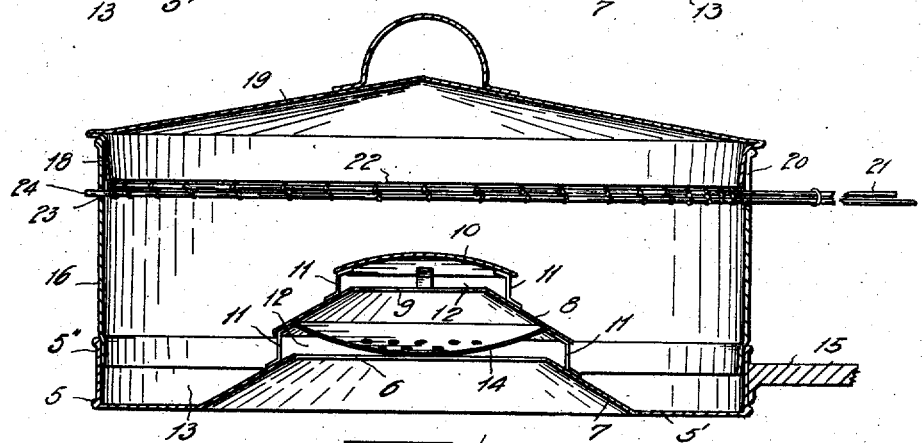
WITNESSES:
Horace Barnes.
E. H. Alvord
INVENTOR
J. H. Cowhig
BY
Pierre Barnes
ATTORNEY

UNITED STATES PATENT OFFICE.

JEREMIAH H. COWHIG, OF BREMERTON, WASHINGTON.

COOKING UTENSIL.

No. 884,718.     Specification of Letters Patent.     Patented April 14, 1908.

Application filed August 7, 1907. Serial No. 387,462.

*To all whom it may concern:*

Be it known that I, JEREMIAH H. COWHIG, a citizen of the United States, residing at Bremerton, in the county of Kitsap and State of Washington, have invented a certain new and useful Improvement in Cooking Utensils, of which the following is a specification, reference being had therein to the accompanying drawings.

This invention relates to cooking utensils; and its object is the provision of improved devices adapted to be used upon the top of the stove and particularly with stoves employing gas or oil as fuel, for broiling, baking and similar operations.

The invention consists in the novel construction, arrangement and combination of parts as will be hereinafter described and claimed.

In the drawings, where similar reference numbers denote corresponding parts in both the views, Figure 1 is a vertical cross elevation of devices embodying my invention adapted to broiling operations. Fig. 2, is a similar view of the invention adapted for baking or the like.

The reference numeral 5 designates the cylindrical base section of the utensil provided with an open top and a bottom 5' which is centrally apertured as at 6 with the material about such aperture formed of a truncated conical shape, as at 7. Positioned at some distance above said truncated portion of the bottom is a similarly shaped member 8 also provided with a centrally arranged aperture 9 and above this member is a hood 10.

The aforesaid hood, member, and bottom are rigidly secured by intermediately disposed supports 11 and are disposed at distances apart to provide interstices 12 between the adjacent parts, and are so proportioned that the centrally disposed member 8 will have its smaller end of less diameter than the adjacent edge of the hood while its larger end will be of greater diameter than that of the adjacent edge of the bottom portion 7 below. The object of such stepped appliances is to distribute the heat from the burner and also to direct the drippings emanating from the broiled meats into the annular gutter-like cavity 13 in the base. To further control the distribution of the heat, I secure a perforated bowl-shaped diaphragm 14 to the underside of the member 8. Said base section is provided with a handle 15 and has the upper portion of its peripheral wall 5'' formed to interfit with the lower portions of similar walls of other sections, such as 16 or 17, to be employed with the base, and the upper portions of the sections 16 and 17 are likewise adapted to interfit with a pendent flange 18 of a cover section 19.

The section 16, see Fig. 1, is formed at its top edge with a vertical slot 20 which extends to a short distance below the depth of the cover flange 18 to serve for the reception of the handle 21 of a grid 22, and diametrically opposite this slot is an aperture 23 serving as a socket for a tang 24 of the grid. By such devices, and upon the removal of the cover, the handle 21 may be withdrawn from the slot and when raised to a sufficient height allow the grid being turned over upon the tang 24 as a pivot still remaining in the socket.

In Fig. 2, I show the invention arranged for baking wherein the section 17 is employed. This section is provided, like the aforedescribed section 16, with a slot 25 and an aperture 26 which are correspondingly disposed, but in this instance the slot extends from the bottom of an opening 27 which itself extends from the top edge of the section. The opening 27 is provided with a hinged closure, or door, indicated by 28, adapted for allowing the contents of an open-top pan to be viewed during the process of cooking and without the necessity of removing the cover which would allow of the ready escape of the contained heat and interrupt a continuance of the cooking operations.

In the drawing, I show a pan suitable for roasting meats, or the like, and comprised of two parts, 29 and 30, adapted to be connected to each other by links 31 upon registering semi-cylindrical tang-pieces 32 and a link 33 is employed to engage the handles 34 of the pan parts. The parts 29 and 30 of the pan have their marginal edges 35 to register for making a close joint therebetween and prevent the escape of vapors which arise from the article being cooked. To reverse the pans the door 28 would first be opened and then by raising the handles 34 clear of the slots the reversal may be conveniently accomplished. While the two parts of the pan may be used in conjunction, as above described, in certain culinary operations, as baking bread or pastry, one of them may advantageously be used alone.

The invention is exceedingly economical in the use of heat, is capable of being controlled to regulate the cooking operations, is of neat and inexpensive construction, and is a valuable adjunct to apparatus hitherto in use for cooking operations.

Having described my invention, what I claim, is—

1. A cooking utensil, comprising a base section having its bottom formed with a conical shaped central portion, a similar shaped member secured to said bottom and a hood secured to said member, said hood and member being positioned so as to furnish interstices therebetween and also between said bottom and the member, a perforated diaphragm connected to said member, a section adapted to interfit with said base section, said second named section being provided with a slot in its peripheral wall and an aperture diametrically opposite from said slot, a device for holding the article being cooked and provided with a handle and a tang which are respectively adapted to be seated in said slot and the aperture, and a cover adapted to interfit with the second named section.

2. A cooking utensil comprising a casing provided in its wall with a slot and opposite said slot with an aperture, a pan provided with a tang and a handle adapted to be respectively seated in said aperture and slot, and a heat distributer comprising a plurality of superposed spaced members, the lower of which embodies an annular base having an upwardly extending flange receiving said casing, said lower member having a centrally truncated cone-shaped portion open at both ends, a second similarly shaped portion mounted thereon, and a hood mounted on said second named member.

3. A cooking utensil comprising a casing having a slot, a pan provided with a handle and a tang which are respectively adapted to be seated in said slot and in an aperture provided in said wall, and a heat distributer comprising a series of spaced members superposed in stepped relation and rigidly secured together, the lower of said members curved to form a gutter-like receptacle for the drippings, the intermediate member being provided with a perforated bottom, and the upper member being in the form of a hood.

In testimony whereof I affix my signature in presence of two witnesses.

JEREMIAH H. COWHIG.

Witnesses:
J. S. IRVINE,
H. J. HOLT.